(12) United States Patent
Kakiuchi

(10) Patent No.: US 8,208,411 B2
(45) Date of Patent: Jun. 26, 2012

(54) TELEPHONE SYSTEM, SERVER AND PROXY RESPONSE TELEPHONE

(75) Inventor: Hiroyuki Kakiuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1022 days.

(21) Appl. No.: 12/169,084

(22) Filed: Jul. 8, 2008

(65) Prior Publication Data
US 2009/0016242 A1     Jan. 15, 2009

(30) Foreign Application Priority Data
Jul. 10, 2007    (JP) ................. 2007-180897

(51) Int. Cl.
H04L 12/16    (2006.01)
H04M 3/42    (2006.01)
G06F 15/16    (2006.01)

(52) U.S. Cl. ............. 370/259; 379/201.01; 379/201.07; 379/201.08; 379/211.02; 709/232

(58) Field of Classification Search .......... 370/259, 370/260; 379/201.01, 201.07, 207.08, 207.16, 379/211.02, 88.12, 88.19, 201.08; 709/232
See application file for complete search history.

(56) References Cited

U.S. PATENT DOCUMENTS

| | | | | |
|---|---|---|---|---|
| 6,101,249 A * | 8/2000 | Weber | ............ | 379/188 |
| 2004/0114744 A1 | 6/2004 | Trossen | | |
| 2005/0100152 A1 * | 5/2005 | Pearson | ........... | 379/207.16 |
| 2006/0029042 A1 | 2/2006 | Nishida et al. | | |
| 2006/0067323 A1 * | 3/2006 | Beck et al. | ........... | 370/395.2 |
| 2006/0252417 A1 | 11/2006 | Abramson et al. | | |
| 2007/0077920 A1 * | 4/2007 | Weeks et al. | ........... | 455/414.1 |
| 2008/0002820 A1 * | 1/2008 | Shtiegman et al. | ...... | 379/211.02 |
| 2008/0009269 A1 * | 1/2008 | Ricci | ........... | 455/412.1 |
| 2008/0233969 A1 * | 9/2008 | Mergen | ........... | 455/456.1 |
| 2009/0280789 A1 | 11/2009 | Takuno et al. | | |
| 2009/0310772 A1 * | 12/2009 | Ricci | ........... | 379/211.01 |

FOREIGN PATENT DOCUMENTS

| | | |
|---|---|---|
| CN | 1953487 A | 4/2007 |
| EP | 1 263 204 A2 | 12/2002 |
| EP | 1 551 164 A2 | 7/2005 |
| EP | 1 624 659 A2 | 2/2006 |
| EP | 1 635 551 A1 | 3/2006 |
| EP | 1 677 499 A1 | 7/2006 |
| JP | 63-245046 | 10/1988 |
| JP | 5-63827 A | 3/1993 |
| JP | 5-095422 | 4/1993 |
| JP | 11-234410 | 8/1999 |
| JP | 2000-125016 A | 4/2000 |
| JP | 2003-110742 | 4/2003 |
| JP | 2004-096194 | 3/2004 |
| JP | 2005-217643 A | 8/2005 |
| JP | 2006-050270 | 2/2006 |
| JP | 2006-081088 | 3/2006 |
| JP | 2006-217148 | 8/2006 |
| WO | 03/056799 A1 | 7/2003 |
| WO | 2006/129692 A1 | 12/2006 |

* cited by examiner

*Primary Examiner* — Marsha D Banks Harold
*Assistant Examiner* — Saad Hassan
(74) *Attorney, Agent, or Firm* — Mattingly & Malur, P.C.

(57) ABSTRACT

A callee confirmation unit is disposed in a proxy response telephone so as to determine whether a call to the proxy response phone is one addressed to a subject number or one to a transfer destination. Upon determination of the call to the transfer destination, the call is received while identifying a callee number to allow for use in a multi-user environment.

14 Claims, 11 Drawing Sheets

INVITE sip:2005@company.com SIP/2.0
From:3001 <sip:3001@company.com>;tag=9fxced76sl
To:2005 <sip:2005@company.com>
Via:SIP/2.0/TCP client.company.com:5060;branch=z9hG4bK74bf9
Call-ID:3848276298220188511@company.com

INVITE sip:2010@company.com SIP/2.0
Via:SIP/2.0/TCP client.company.com:5060;branch=z9hG4bK74bf9
From:3001 <sip:3001@company.com>;tag=9fxced76sl
To:2010 <sip:2010@company.com>
Call-ID:3848276298220188511@company.com
History-Info: <sip:2005@company.com>;index=1
History-Info: <sip:2010@company.com>;index=1.1

| CALLEE NO. | CALLER NO. | INCOMING TIME | MESSAGE STORED | STORED FILE NAME | CONFIRMED |
|---|---|---|---|---|---|
| 2005 | 5001 | 2/4  17:50 | YES | 2005001 | YES |
| 2006 | 2450 | 2/4  20:25 | NO | | |
| 3001 | 03-xxx-xxx | 2/5   9:02 | YES | 3001004 | NO |
| 2005 | 3001 | 2/5  15:30 | YES | 2005002 | NO |
| ⋮ | | | | | |

FIG.12

■ INCOMING VOICE MESSAGE    (2010)

CALLEE: 2005(AAA)
CALLER: 3001(BBB)

TRANSMITTING ABSENT MESSAGE

INVITE sip:2010@company.com SIP/2.0

Via:SIP/2.0/TCP client.company.com:5060;branch=z9hG4bK74bf9

From:3001 <sip:3001@company.com>;tag=9fxced76sl

To:2010 <sip:2010@company.com>

Call-ID:3848276298220188511@company.com

User-Agent: 2005 "sip:2005@company.com"

TELEPHONE SYSTEM, SERVER AND PROXY RESPONSE TELEPHONE

CLAIM OF PRIORITY

The present application claims priority from Japanese patent application serial no. 2007-180897, filed on Jul. 10, 2007, the content of which is hereby incorporated by reference into this application.

BACKGROUND OF THE INVENTION

The present invention relates to a telephone system, a server, and a proxy response telephone operated based on Internet Protocol (IP), and more particularly, to a telephone system with high convenience with respect to an IP telephone environment with high utilization of softphone, the server and the proxy response telephone.

Systems and mechanisms for presenting various types of services have been invented accompanied with the recent rapid distribution of the IP phone. An answer phone system which presents the function for automatically recording the message when the receiver is absent has been introduced as one of the aforementioned systems.

The basic structure and mechanism of a voicemail system will be described referring to FIG. 2 of JP-A-2006-081088 (EP 1635551 A1) as related art. Referring to the drawing, the central control unit serves as a so-called exchange for executing the call control among telephone terminals. When a caller calls a transmission terminal B from a communication network terminal A, the series of operations is performed as follows. (1) The terminal A generates a terminal B call signal to access the exchange or the call control server of the central control unit; (2) The central control unit detects/connects the terminal B to transmit the terminal B call signal; (3) When the terminal B is kept unresponsive to the call signal for a predetermined time, the central control unit confirms the unresponsiveness of the terminal B. Then the central control unit performs the following operations, that is, (4) connects the terminal A to the voicemail server for centrally storing the voice information upon unresponsiveness of the terminal B; and (5) sets the communication route to allow communication between the terminal A and the voice mail server. Subsequently, the following operations are performed, that is, (6) The voice information from the caller of the terminal A is transmitted to the voice mail server so as to be recorded therein; (7) The central control unit reports to the terminal B that the voice information has been recorded; (8) When the receiver confirms the display on the terminal B that the voice information has been recorded in the voicemail server, the terminal B requests the recorded voice information by connecting with the central control unit to call the voicemail server; (9) The voice information addressed to the terminal B is detected; and (10) the voice information is transmitted to the terminal B to be replayed via the central control unit such that the receiver confirms the voice information.

The answer-phone server is regarded as the system taking substantially the same process as the voicemail server described herein for presenting the similar function.

JP-A-2006-050270 discloses the system with further enhanced convenience compared with the voicemail server system using the ordinary voice-mailing process. In the system, the server user registers the detailed settings in the Web server corresponding to the voicemail server as described above such that the message of the caller is recorded before answering the phone when the user is absent.

Meanwhile, JP-A-2003-110742 discloses the voicemail system with improved convenience by recording and storing the voice message (message information) of the caller in the voicemail data storage region in the RAM contained in the IP phone terminal to be managed based on the IP address. The message information from the caller is stored in the phone terminal rather than the server for centrally storing the message information.

The company work style has been transformed accompanied by the advancement of the network system or communication equipment such as the IP phone. For example, the work style called a free address system allows an employee to freely choose a desk for working on a daily basis rather than working on a desk laid out fixedly. The free address system realizes the layout free office style allowing the employees to freely change the work place depending on mood of the day or the project they are involved in. The free address system employs a softphone installed in a personal computer (hereinafter referred to as PC). Any place may become the office which allows the PC to work so long as it is complete with a handset for the PC and the softphone and an environment with good internet access. The use of the softphone, thus, releases the employee from the office environment tied to the landline phone. In the most advanced office using the free address system, the laptop PC and the softphone are delivered to every employee while setting several landline phones supplementary for the respective block of desks.

JP-A-63-245046 discloses that the identification information contained in the call control information is determined, and the incoming pattern is changed in accordance with the determination result.

JP-A-5-095422 discloses a center storage answer phone device to be connected to an analog PBX.

JP-A-11-234410 and JP-A-2004-096194 disclose that plural phone numbers are assigned to a single phone so as to vary the incoming ringtone depending on the assigned phone number.

JP-A-2006-217148 discloses the invention having the schedule of a receiver of the call confirmed in reference to the schedule management section for determining the required operation selected from reception of the call, answer phone processing, and transfer based on the confirmed information.

Figure 1:
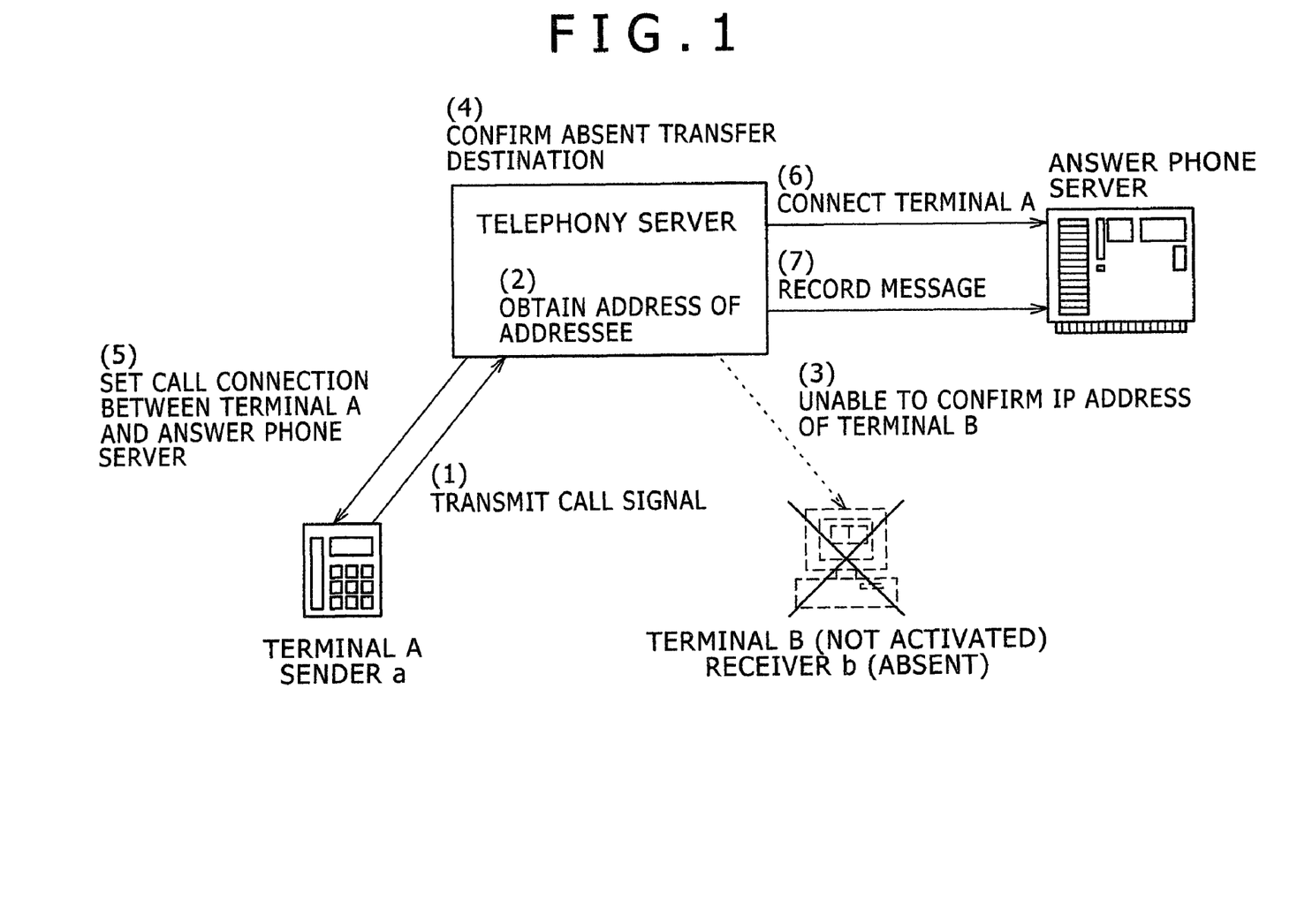
FIG. 1 is a block diagram showing an operation of a telephone system when a softphone user is absent.

The operation of an answer phone system in an environment using a softphone will be described referring to FIG. 1. FIG. 1 is a block diagram showing how the phone system is operated when the softphone user is absent. Referring to FIG. 1, a receiver b as a user of the softphone as the IP phone is absent, and accordingly a terminal B is OFF. In the aforementioned state, the call from a terminal A to the terminal B is performed as follows.

(1) The terminal A transmits a terminal B call signal to a telephony server.
(2) The telephony server tries to obtain the IP address for connection to the terminal B from the table stored therein.
(3) The telephony server, however, fails to obtain the IP address as the terminal B is OFF.
(4) Then the telephony server confirms the callee registered as the destination of the absent transfer for the terminal B.
(5) It sets the call connection to the terminal A, and
(6) further sets the call connection to the answer phone server.
(7) The answer phone server then stores the message information.

In the case where the answer phone system is employed in an office environment with high utilization of the softphone, the absent transfer process using the answer phone server allows the call to the softphone in the OFF state to be transferred to the answer phone server designated as the absent transfer destination. In the office environment as shown by FIG. 2 of JP-A-2006-081088, when the softphone user is expected to be one hour late to work owing to urgent circumstance, he/she may ring the terminal B to leave a message to his/her colleague in the office. If his/her phone accepts a call, proxy response may be made such that the colleague notifies the caller of the message of the employee who will be one hour late to work. Meanwhile in the office where the employees use the softphones, and the answer phone server is installed, the unreceived call will be unconditionally transferred to the answer phone server. As a result, the colleague of the employee is unable to know that the call has been made to him/her.

To cope with the aforementioned problem, the call is transferred to the other phone in the office first when the softphone is OFF. If there is no response to the call for a predetermined period, the caller's message is further transferred to the answer phone server to perform the answer phone process. Such a system may be effective for preventing the missed call in the office. However, the aforementioned system is not the solution to reduce the unnecessary answering or making the proxy response to the call by employing the answer phone server. This system may make the caller wait for a long time during the call.

Alternatively, the system setting may be changed and registered to the telephony server to allow the softphone user to temporarily transfer the message to the answer phone server, or to transfer the message to another phone in the office. However, since such change has to be made manually, the system becomes less flexible, and causes another problem of failure to return the setting.

JP-A-2006-050270 discloses a system which is not intended to be employed in an environment with a high utilization of the softphone, and accordingly, does not assume the case where the telephone to which the phone call is made is not turned ON.

Even if the system for storing answer phone data in the phone terminal as disclosed in JP-A-2003-110742 is employed, the fundamental problem still exists, that is, the message cannot be received unless the power supply for the softphone terminal is turned ON. If the landline phone supplementarily set in the office is designated as the absent transfer destination, and the system as disclosed in JP-A-2003-110742 is applied to the landline phone, the message information may be stored. However, since the softphone does not correspond to the landline phone one-by-one, the messages addressed to the plural phone terminals will be stored in the single landline phone. The system is unable to identify to whom the message has been addressed.

Employment of the proxy response/answer phone function in a large-sized IP phone system may require establishment and installation of a server tailored to the size, resulting in a significant economic hurdle. A simple proxy response function in a unit of the floor or group of the office is thus highly demanded.

The present invention solves the above problems, provides an appropriate proxy response service to the softphone user and the office with the free-address system, and further provides a method for realizing a highly flexible proxy response function and a system thereof in accordance with the user's circumstance.

SUMMARY OF THE INVENTION

The present invention provides a telephone system which includes an IP phone, an IP proxy response phone, and a server for controlling reception/transmission between the IP phone and the IP proxy response phone. The server determines a state of the IP phone upon incoming of a call addressed to the IP phone. When it is determined that the IP phone is unable to answer the call, the server applies an identifier of the IP phone to transfer the incoming call to the IP proxy response phone.

The present invention provides a server connected to an IP phone and an IP proxy response phone for controlling transmission/reception of a call between the IP phone and the IP proxy response phone. When an incoming call is addressed to the IP phone, a state of the IP phone is determined. When it is determined that the IP phone is unable to receive the call, the server applies an identifier of the IP phone to transfer the incoming call to the IP proxy response phone.

The present invention provides an IP proxy response telephone connected to a telephone and a telephony server via a network. When an INVITE message is received from the telephony server, the INVITE message is analyzed, and it is determined whether the message is a transferred call or addressed to the IP proxy response phone, based on which ringtone is output.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Embodiments will be described referring to the drawings. The same components in the embodiments will be designated as the same reference numerals, and explanations thereof will be omitted.

Figure 2:
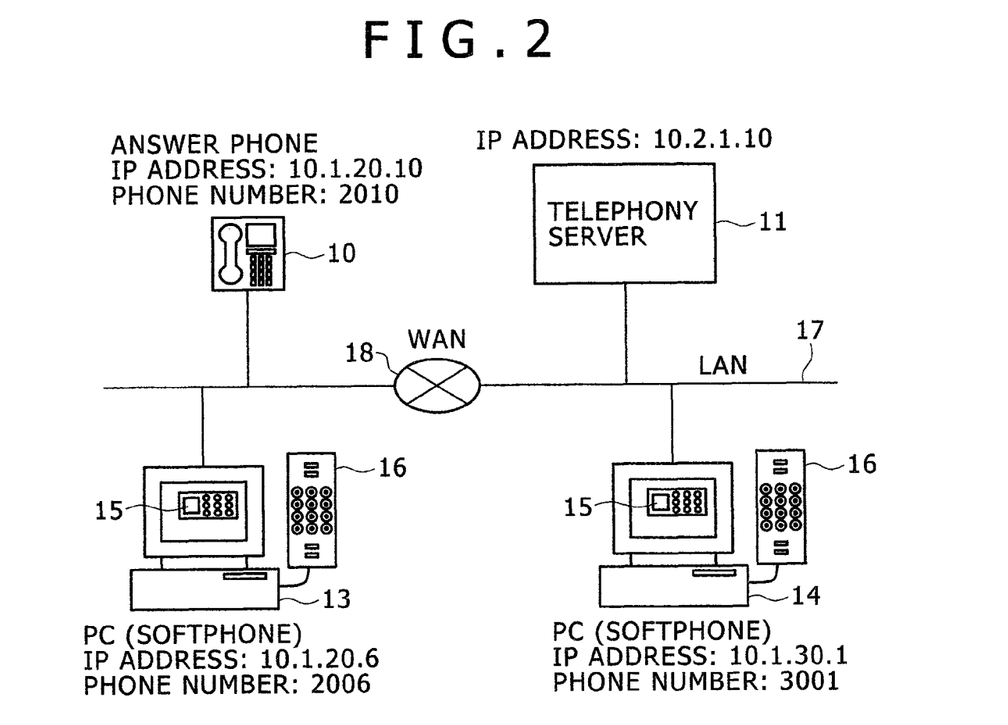
FIG. 2 is a block diagram showing a network to which an answer phone system is applied.

FIG. 2 is a block diagram showing a network to which an answer phone system is applied. Referring to FIG. 2, IP phone terminals are connected via an IP network such as LAN (Local Area Network) 17 and WAN (Wide Area Network) 18. The IP phone terminal has various types including a landline IP phone (not shown) which can be directly connected to the LAN, one formed by connecting a handset 16 equipped with a speaker/microphone for a phone application program 15 (hereinafter referred to as the softphone) connected to PCs 13 and 14, and an answer phone 10 of landline IP phone type for providing the answer phone service. A telephony server 11 manages the IP phone terminals (answer phone 10, PCs 13 and 14) within the IP phone system, and executes the call control for communication among those phone terminals. When establishing the IP phone system, IP addresses and phone numbers are required to be assigned to all the IP phone terminals (answer phone 10, PCs 13 and 14). The IP address of 10.1.20.10 and the phone number of 2010 are assigned to the answer phone 10, the IP address of 10.1.20.6 and the phone number of 2006 are assigned to the PC 13, and the IP address of 10.1.30.1 and the phone number of 3001 are assigned to the PC 14, respectively. IP address of 10.2.1.10 is assigned to the telephony server 11. The aforementioned terminal setting information (IP addresses, phone numbers and the like) has to be registered in the telephony server 11 as the management information (see FIG. 3). Keeping consistency of the data with respect to the setting allows the IP phone system to function.

Figure 3:
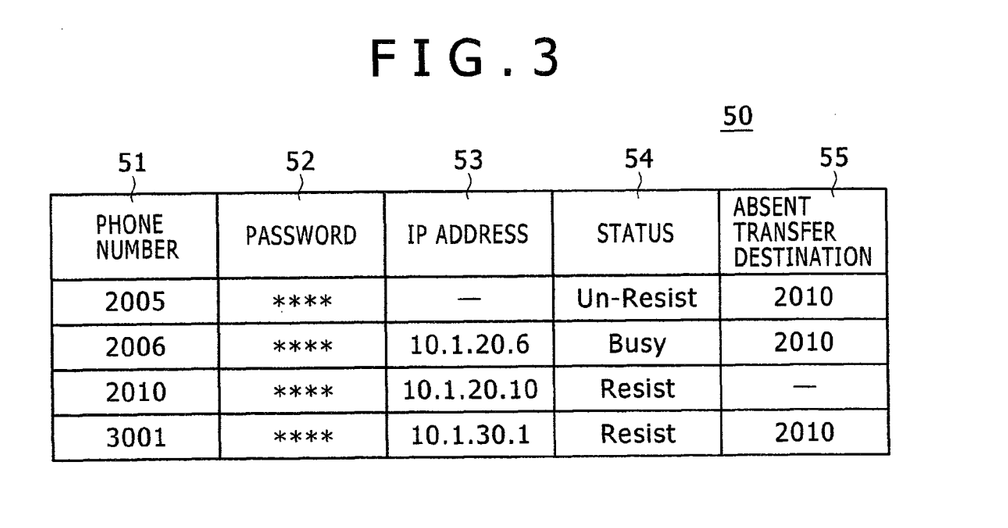
FIG. 3 is an explanatory view of a management information table registered in a telephony server.

FIG. 3 shows a management information table registered in the telephony server. Referring to FIG. 3, a management information table 50 includes data such as a phone number 51 for identifying the IP phone terminal, a password 52, based on which the determination is made with respect to validity of the terminal to be connected and registered into the telephony server 11, an IP address 53 for locating the terminal position on the IP network, a status 54 for storing the state of the IP phone terminal, and an absent transfer destination 55 for designating the transfer destination when the IP phone terminal correlated to the phone number is not connected, or it is not connected because of a busy line. The terms "Un-Resist", "Busy" and "Resist" in the column of the status 54 denote "absent", "engaged on the phone", and "present and not busy", respectively. When the status is either Un-Resist or Busy, the telephony server 11 transfers the call to the answer phone 10 with the phone number of 2010.

Figure 4:
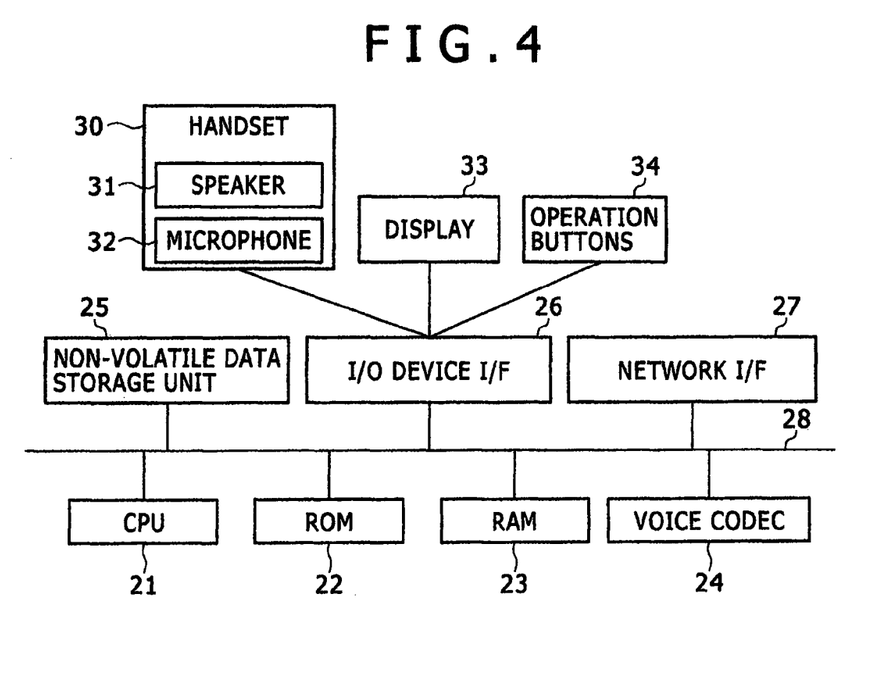
FIG. 4 is a hardware block diagram of an answer phone.

FIG. 4 is a hardware block diagram of the answer phone. Referring to FIG. 4, the answer phone 10 consists of a CPU 21 which controls the whole system, a ROM 22, a RAM 23, a voice CODEC 24, a non-volatile data storage unit 25, an input/output device interface (hereinafter referred to as I/F) 26, and a network I/F 27 via a bus 28. The input/output device I/F is connected to a handset 30 formed of a speaker 31 and a microphone 32, a display 33 and operation buttons 34.

Figure 5:
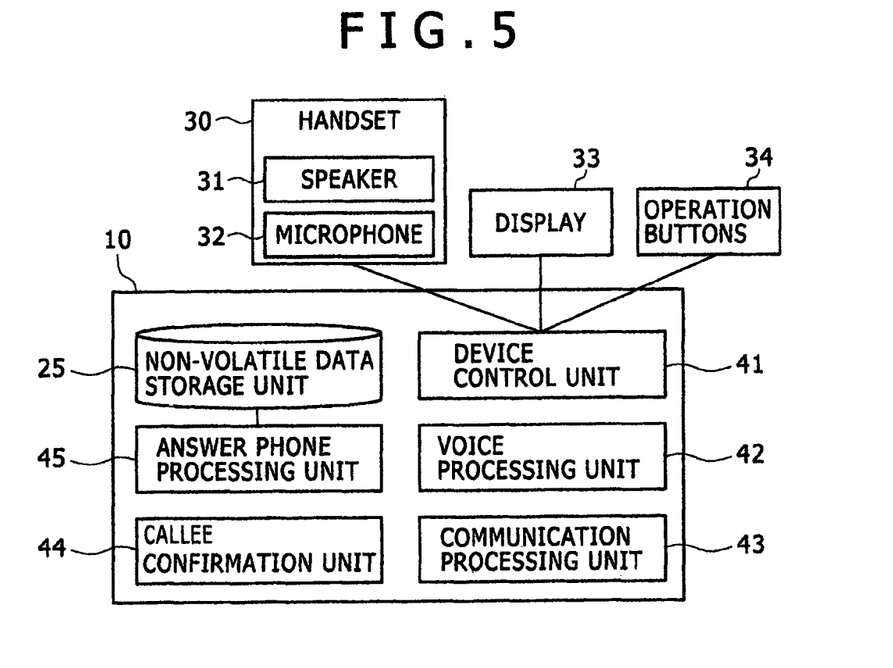
FIG. 5 is a functional block diagram of the answer phone.

FIG. 5 is a functional block diagram of the answer phone. Referring to FIG. 5, a device control unit 41 controls devices such as the handset 30 via the input/output device I/F 26. A voice processing unit 42 controls a process for encoding voice information and a process for decoding the encoded bit data through the voice CODEC 24. A communication processing unit 43 controls a network communication process via the network I/F 27. A callee confirmation unit 44 reads callee information written in INVITE message received by Session Initiation Protocol (hereinafter referred to as SIP), and controls execution of the process according to the read information. An answer phone processing unit 45 controls such processing as transmission, recording, and confirmation of the absent message based on the result of the process performed in the callee confirmation unit 44. The process relevant to the callee confirmation unit 44 will be further described in detail referring to FIG. 10.

Figure 6:
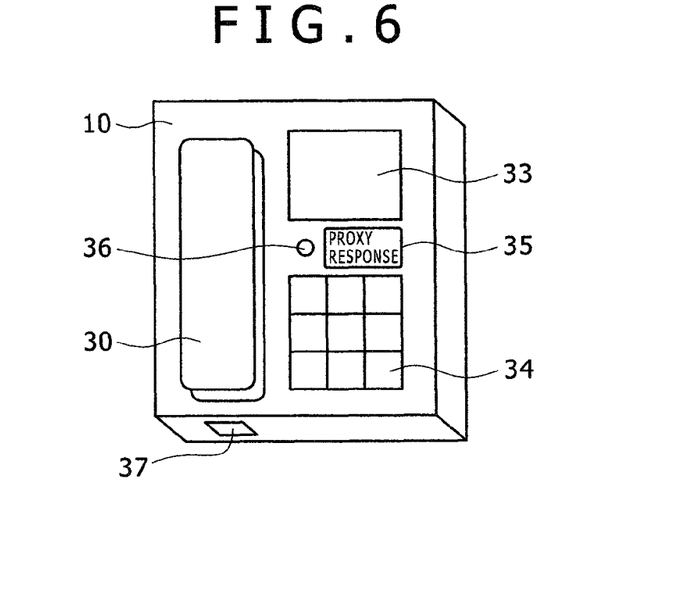
FIG. 6 is a perspective view of the answer phone.

FIG. 6 is a perspective view of the answer phone. The answer phone 10 includes the handset 30, the display 33, operation buttons 34, an operation button 35 to which the proxy response function is allocated, a lamp 36 which notifies the incoming call with illumination, and a LAN connector 37 for connecting a LAN cable.

The SIP protocol will be described hereinafter. The SIP protocol is one of the communication control protocols for the IP phone. It is standardized by IETF (Internet Engineering Task Force) as the Internet standard-setting organization, and defined as the standard track by RFC3261 published in 2002, having various extensions defined as RFC thereafter. The message based on the SIP protocol is written in text, which is simple and exhibits high expandability.

Figure 7:
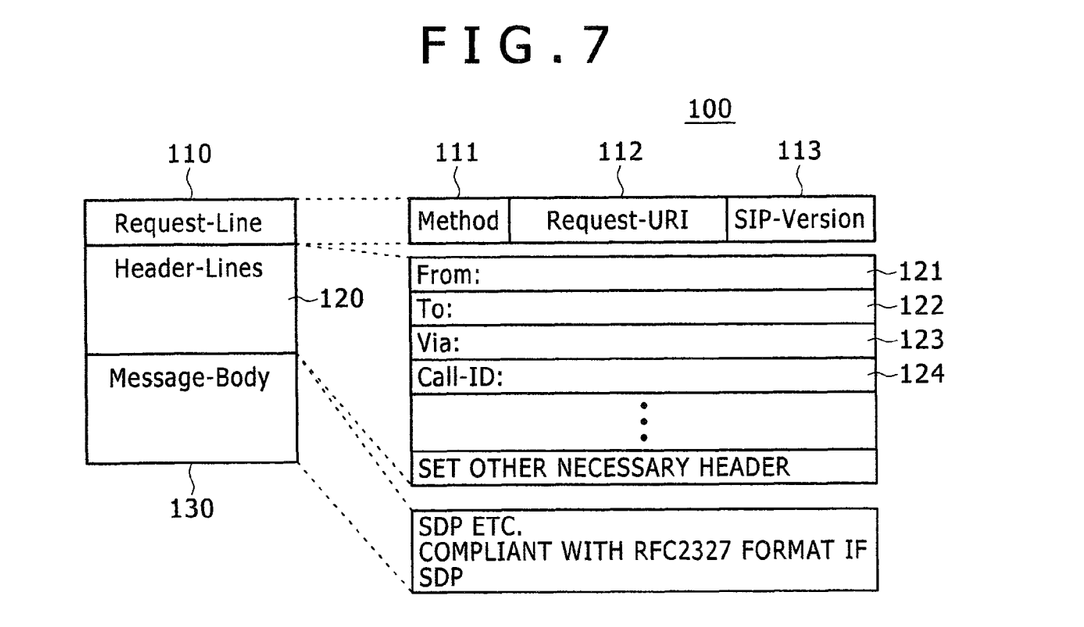
FIG. 7 shows a basic format of a SIP message.

The basic format of the SIP message will be described referring to FIG. 7. FIG. 7 shows the basic format of the SIP message. A basic format 100 is divided into three sections including a Request-Line 110 representing the request, Header-Lines 120 where information with respect to callee and caller is written, and a Message-Body 130 where the available function is written. The Header-Line 120 and the Message-Body 130 may be omitted or extended where appropriate.

The Request-Line 110 includes a Method 111, a Request-URI 112, and a SIP-Version 113. The Header-Lines 120 are formed of a From header 121, a To header 122, a Via header 123, and a Call-ID header 124.

Figure 8:
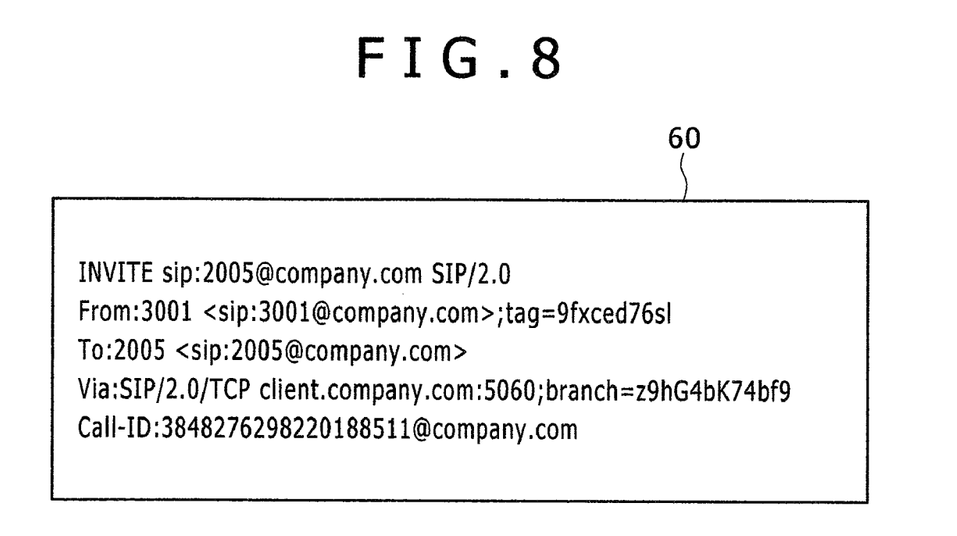
FIG. 8 is an explanatory view of an INVITE message.
Figure 9:
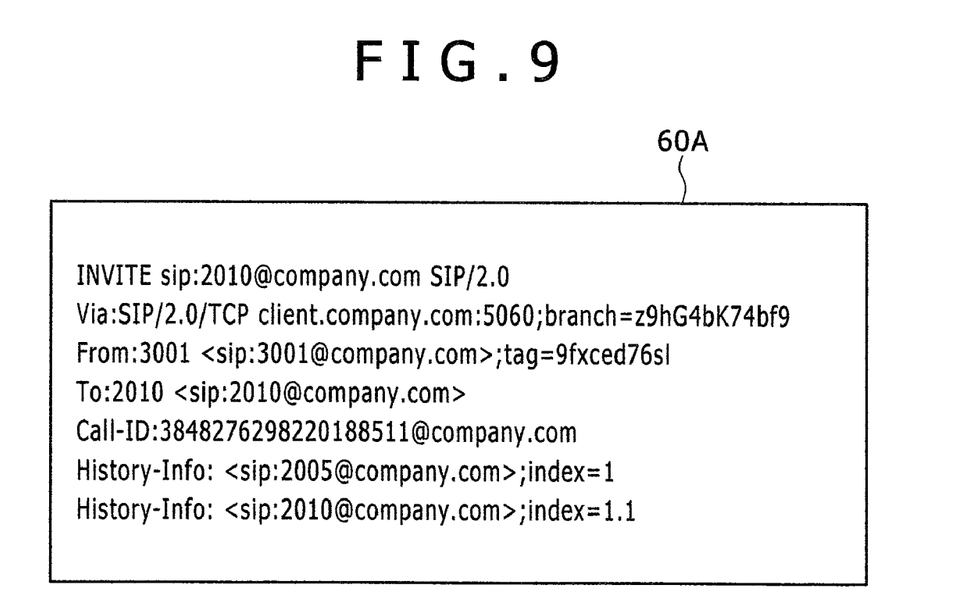
FIG. 9 is an explanatory view of the INVITE message using a History-Info header.

Referring to FIGS. 8 and 9, the INVITE message sent from the IP phone terminal based on the SIP protocol will be described. FIG. 8 is an explanatory view showing the INVITE message. FIG. 9 is an explanatory view showing the INVITE message using a History-Info header.

Referring to FIG. 8, the request sentence requiring the connection of the call to No. 2005 is written on the first line of the INVITE message 60. The caller information is written at the From header, and the callee information is written at the To header. The INVITE message 60 represents the request for connecting the call from No. 3001 to No. 2005.

The method for identifying the caller information and the callee information in the SIP message will be described. Referring to FIG. 8, the caller and the callee are identified in reference to the From header and the To header, respectively. However, the use of the aforementioned process does not always provide the correct information when performing the transfer process or the proxy reception of the phone. Specifically, when the phone #2005 does not respond to the call, and the absent transfer is performed to the phone #2010 in accordance with the register information shown in FIG. 3, the information of the To header will be overwritten to No. 2010. As a result, the phone #2010 as the receiver cannot determine the original callee information. For solving the aforementioned problem, plural processes have been proposed with respect to the procedure for notifying the original callee information by extending the SIP protocol. The method for identifying the callee information using a History-Info header as one of the plural processes will be described hereinafter.

Referring to FIG. 9, the INVITE message using a History-Info header will be described. Referring to FIG. 9, the request sentence is written on the first line of an INVITE message 60A, requiring connection of the call to the phone #2010. The caller information and the callee information are shown at the From header and the To header, respectively. The INVITE message 60A indicates the request for connecting the call from the phone #3001 to #2010. However, the history with respect to transfer of the callee information recorded in the History-Info header shows that the message has been transferred from the phone #2005 to #2010.

Figure 10:
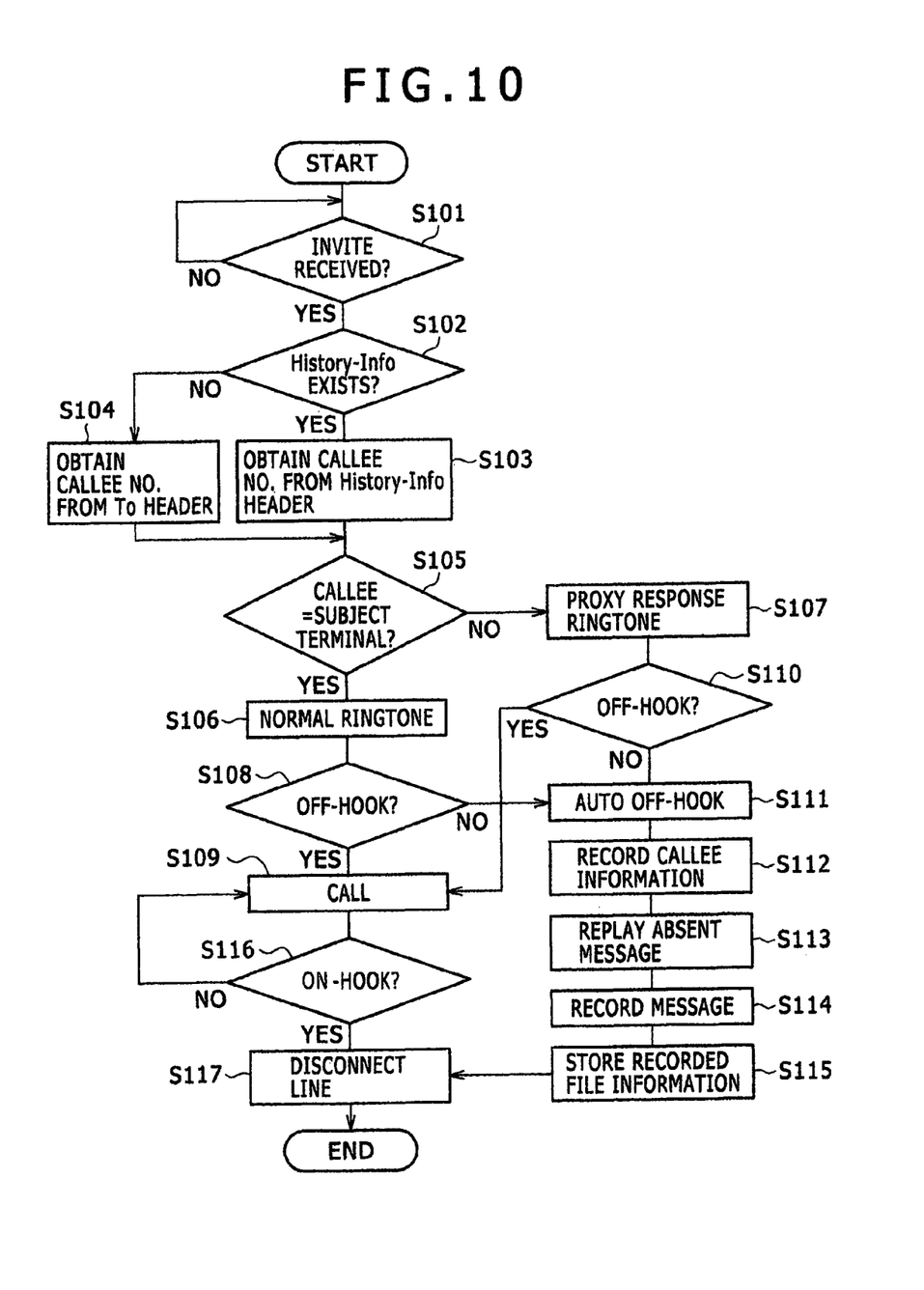
FIG. 10 is a flowchart of a process performed in the answer phone upon an incoming call.

Next the procedure of the process will be described referring to FIGS. 10 to 13. FIG. 10 is a flowchart of the process with respect to an incoming call of the answer phone.

Figure 11:
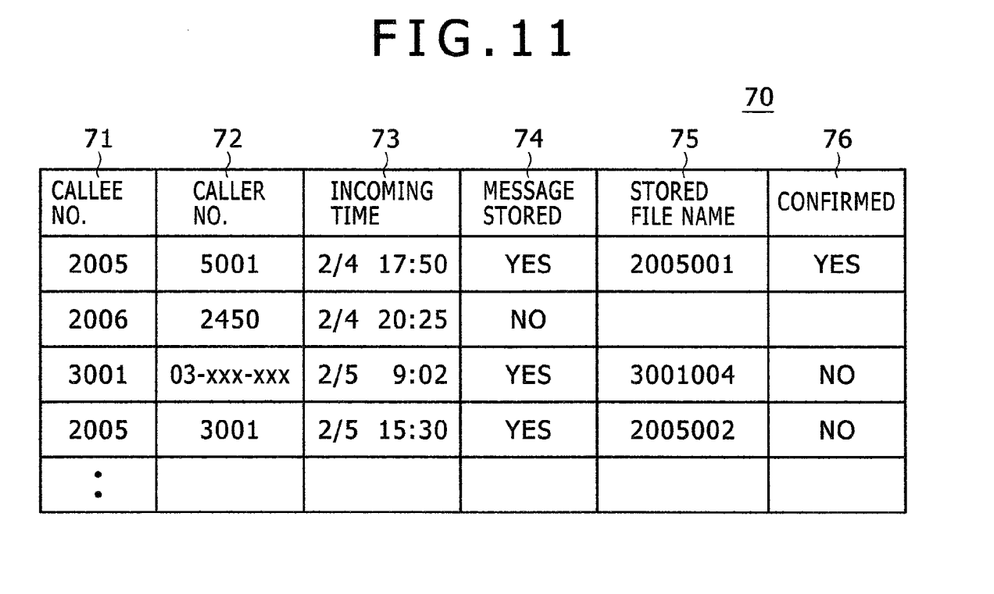
FIG. 11 is an explanatory view of an answer phone data information table.
Figure 12:
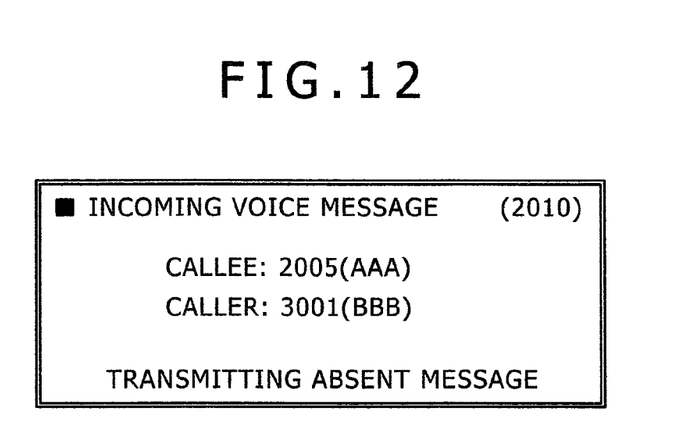
FIG. 12 shows a display on the answer phone.
Figure 13:
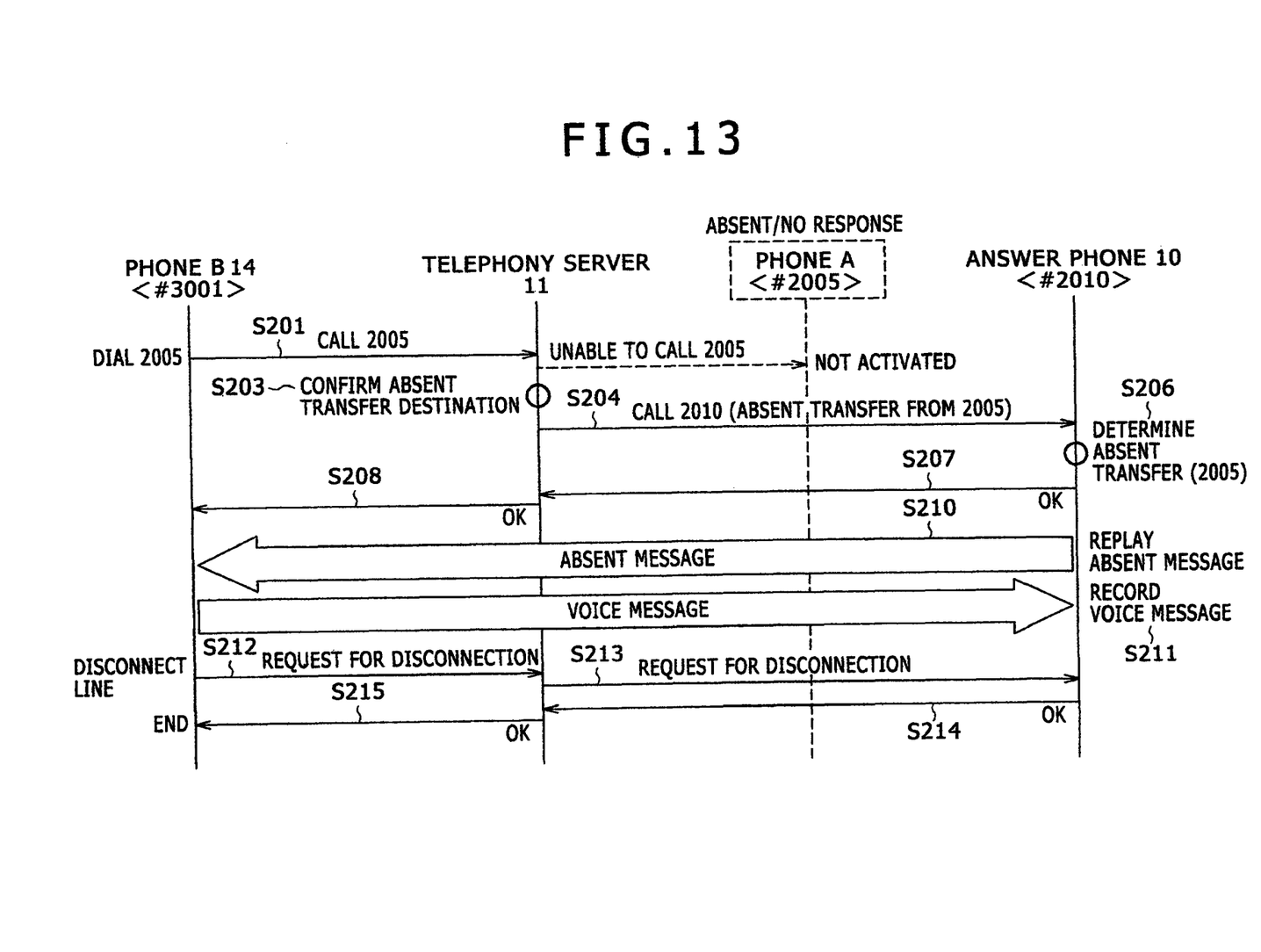
FIG. 13 is a view showing a sequence of an absent transfer process performed among the phones with the caller, the telephony server and the answer phone.

FIG. 11 is an explanatory view showing the answer phone data information table. FIG. 12 shows a display on the answer phone. FIG. 13 shows a sequence of the absent transfer process of the phone with the caller, the telephony server, and the answer phone.

The process shown by the flowchart of FIG. 10 starts when power is supplied to the answer phone 10, the setting of the IP address and the phone number is appropriately performed, and the IP phone terminal starts functioning. In step S101, it is determined whether the answer phone 10 has received the INVITE message indicating the incoming call. If the message has not been received (S101; No), the determination is repeatedly performed until the message is received. When the answer phone 10 has received the message in step S101, it is determined whether the History-Info header exists in the INVITE message (S102). If the History-Info header exists (S102; Yes), the answer phone 10 obtains the first callee number written at the History-Info header (S103). When the History-Info header does not exist (S102; No), the answer phone 10 obtains the callee number written at the To header (S104).

The answer phone 10 determines whether the callee number obtained in the previous process is the same as the phone number of the subject terminal (S105). If it is the same (S105; Yes), the incoming call is notified by outputting the normal ringtone (S106). Meanwhile, when the obtained callee number is not the same as the phone number of the subject terminal (S105; No), the answer phone 10 outputs the ringtone with a pattern different from that of the normal one so as to notify with respect to the call resulting from the absent transfer (S107). The answer phone 10 determines whether the state becomes off-hook to the call in step S106 (S108). In the case of off-hook (S108; Yes), the communication with the caller is started (S109). Meanwhile, the answer phone 10 determines whether the state has become off-hook in a preliminarily set period of time with respect to the call in step S107 (S110). If the state becomes off-hook (S110; Yes), the answer phone 10 transfers to the answer phone data information in step S109.

When the predetermined time elapses without setting off-hook (S110; No), the answer phone 10 automatically sets off-hook (S111), and stores the callee information obtained in step S103 or step S104 in the answer phone data information table (S112). The answer phone 10 transmits the absent message to the caller (S113), and receives the caller's message to be recorded (S114). When the recording of the message is finished, the answer phone 10 further stores the recorded file information and the caller information correlated with the answer phone data information table (S115), and sets on-hook (S117). When the state is not brought into off-hook in a period preliminarily set in step S108 (S108; No), the process proceeds to step S111 for executing the answer phone recording process.

After talking with the caller in step 109, the process executes determination in step S116 with respect to the on-hook state until Yes is obtained. When the state becomes on-hook (S116; Yes), the process proceeds to step S117 to end the routine by disconnecting the line.

The process to be executed in steps S102 to step S105 corresponds to the process to be executed by the callee confirmation unit 44 as shown in FIG. 5.

The answer phone data information table to be stored in the non-volatile data storage unit 25 of the answer phone 10 in step S112, step S114 and step S115 will be described referring to FIG. 11. An answer phone data information table 70 stores callee numbers 71, caller numbers 72 in reference to caller report information, and incoming time 73 in step S112 of the flowchart in FIG. 10. In step S114 of FIG. 10, when the message from the caller is recorded, the information notifying storage of the message is written in a message stored 74. The stored file name 75 stored in step S115 is recorded such that the file name is correlated with the answer phone data information table 70. The confirmation column 76 at the end of the table is an information column for recording the number of the missed call or whether the user has confirmed the messages. The process for using the confirmation column 76 and definition thereof will be described later referring to FIGS. 14 and 15.

FIG. 12 shows an exemplary display 33 of the answer phone 10, representing a display upon execution of step 113 of FIG. 10. The message of incoming voice message is displayed on the top of the display. The callee information stored in step S112 and the caller number obtained by the caller number report function are displayed below the message. In the case where the single answer phone 10 receives plural voice messages from different phone terminals, to whom the absent message has been transferred, or who made a phone call may be clearly identified. The determination with respect to the need of proxy response may be momentarily made.

Referring to FIG. 13, the process for recording the voice message will be described in the situation where a phone B (#3001) calls a phone A (#2005) in an OFF state, and the call is then transferred to the answer phone (#2010).

When the user of the phone B dials 2005 to call the user of the phone A, the number of the phone B is transmitted to the telephony server 11 (S201). In response to reception of the call connection request from the phone #3001, the telephony server 11 obtains the address of the phone #2005 from the management information table 50. Since the status 54 of the phone #2005 is Un-Resist (OFF state), the address of a transfer destination 55 to which the call is transferred is confirmed (S203). The history of the call connection to the phone #2005 is written on the History-Info header, and the call connection request is sent to the phone #2010 (S204). Upon reception of the call connection request, the answer phone 10 of the phone #2010 determines the address from the INVITE message of the call connection request (S206). Based on the determination result, off-hook is set as the proxy response (S207). In response to the off-hook of the answer phone 10, the telephony server 11 connects the answer phone 10 with the phone B 14 (S208). In this way, the communication through the call connection is established.

The answer phone 10 transmits the message indicating absence of the callee based on the automatic proxy response in the answer phone process (S210). The answer phone 10 receives the caller's message so as to be recorded (S211). The caller operates to allow the phone B 14 to transmit the disconnection request to the telephony server 11 (S212). The telephony server 11 transmits the disconnection request to the answer phone 10 (S213). Then the answer phone 10 disconnects the line (on-hook: S214). The telephony server 11 transfers the on-hook state to the phone B 14 (S215), and the series of the call control process ends.

In the aforementioned embodiment, the answer phone 10 is designated as the transfer destination in the information management table of the telephony server 11 so as to appropriately perform the answer phone process, thus providing an answer phone system which allows the employee in the office to flexibly perform the proxy response in the case of the call to the softphone in an OFF state.

The process for confirming the message recorded in the answer phone 10 will be described referring to FIGS. 14 and

15. FIG. 14 represents a sequence for confirming the voice message with respect to the phone A and the answer phone 10. FIG. 15 represents a flowchart of the process for confirming the voice message in the answer phone 10.

Figure 14:
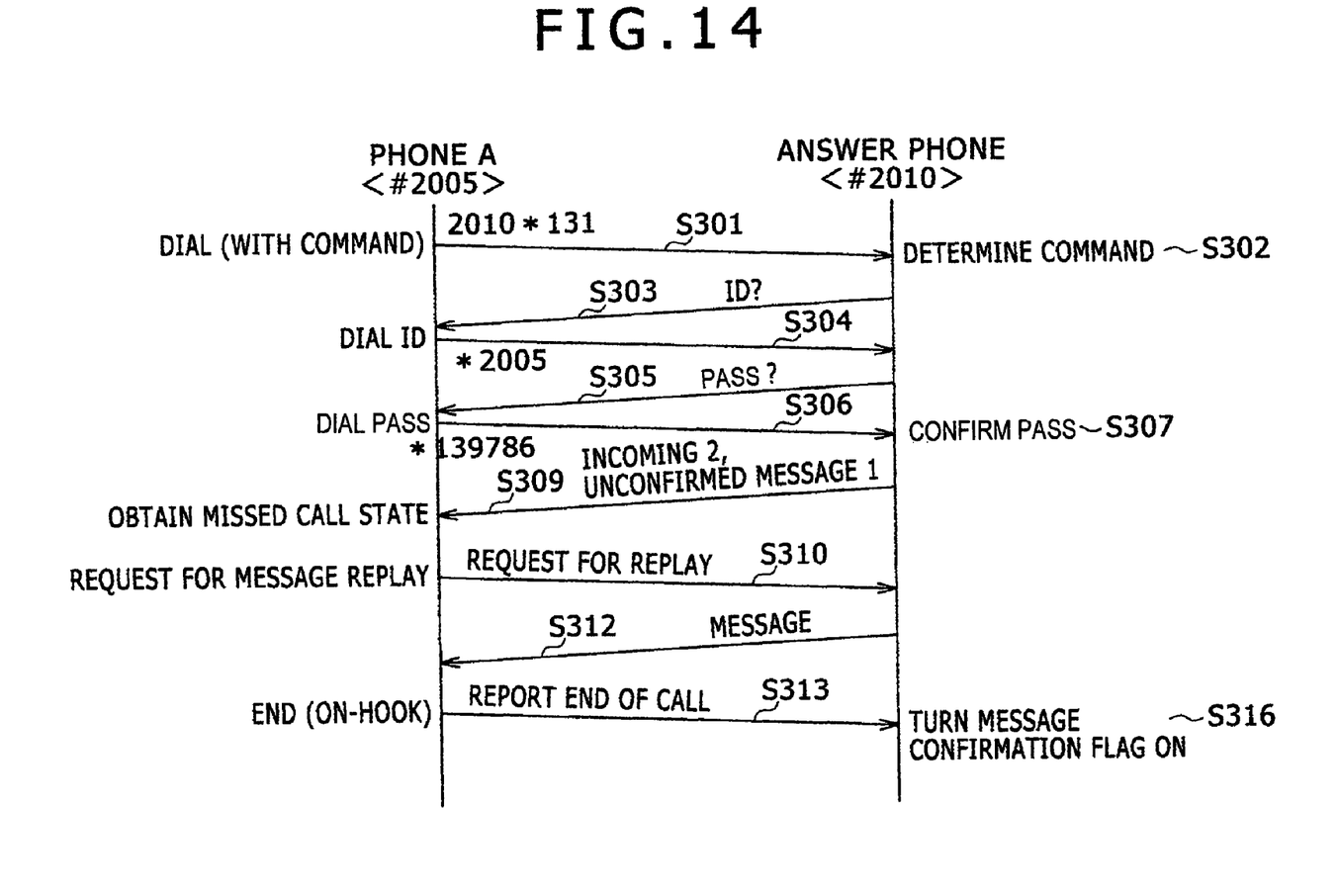
FIG. 14 is a view showing a sequence of the process for confirming the stored answer phone message.
Figure 15:
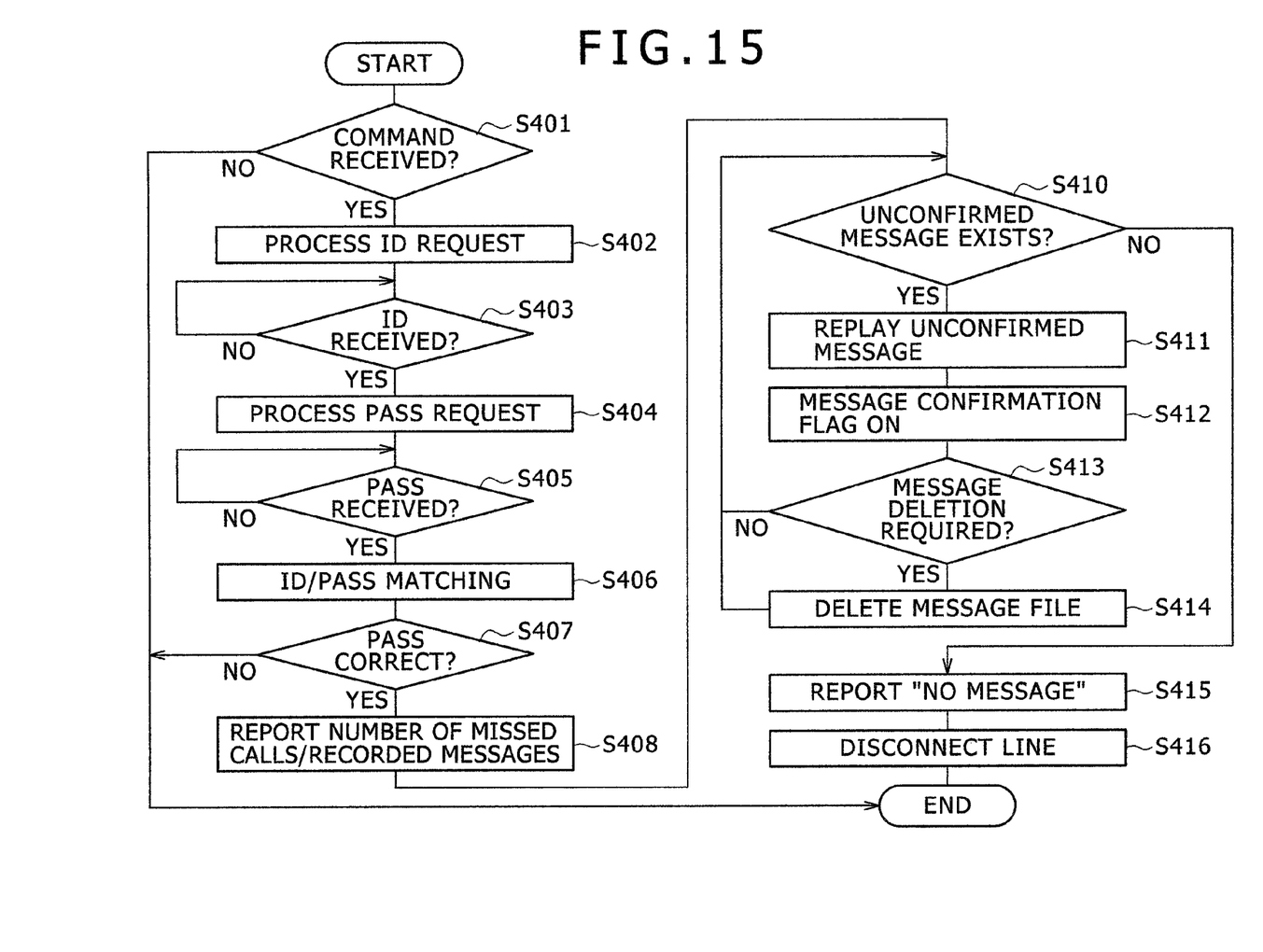
FIG. 15 is a flowchart of the process for confirming the stored answer phone message.

Referring to FIG. 14, upon reception of the PB signal of the button "*" as the phone button, the answer phone 10 is structured to recognize the subsequently received input key as the command. For simplifying the view, the telephony server through which the call connection/disconnection is performed is not shown in the drawing.

The user registers the answer phone with the phone #2010 as the transfer destination, and operates the phone A to call the phone #2010 for confirming the recorded message addressed to the user. The user pushes the "*" button subsequent to the phone number to push the predetermined confirmation command ("131" herein) of the recorded message. Then the phone A transmits the number 2010*131 to the answer phone 10 (S301). The answer phone 10 starts confirming the recorded message by determining the command (S302). Upon reception of the command, the answer phone 10 requests the ID number (user's "phone number"=ID) for confirming the operation user (S303). When the operation user dials his/her own ID, the phone A transmits the number "*2005" to the answer phone 10 (S304). The answer phone 10 receives the ID and requests the password (hereinafter referred to as PASS) for confirming the adequacy of the ID (S305). When the operation user dials PASS, the phone A transmits the password *139786 to the answer phone 10 (S306). The answer phone 10 receives PASS so as to be referred to the registered information (S307). As the ID coincides with PASS, the answer phone 10 reads the number of missed calls, and the number of recorded messages which have not been confirmed by the operation user so as to be transmitted to the phone A (S309). At this time, the operation user pushes the command for request of replay, the phone A transmits the replay request to the answer phone 10 (S310). The answer phone 10 receives the replay request command to replay the message (S312). The operation user confirms the message and sets on-hook such that the phone A transmits the end report to the answer phone 10 (S313). Upon reception of the end report, the answer phone 10 writes the information indicating that the confirmation has been done in the answer phone data information table 70.

Referring to FIG. 15, the routine performed in the answer phone 10 during confirmation of the voice message will be described. Specifically, the routine corresponds to the process performed by the answer phone processing unit 45. The routine starts upon an incoming call received by the answer phone 10. The answer phone processing unit 45 determines whether the command as described referring to FIG. 14 has been received (S401). When the command has not been received (S401; No), the routine ends. When the command has been received (S401; Yes), the answer phone processing unit 45 requests the operation user as the caller to input the ID (S402), and the determination is made with respect to reception of the ID (S403). When the ID has not been received (S403; No), the answer phone processing unit 45 waits for the input of the ID. When the ID has been received (S403; Yes), the answer phone processing unit 45 requests input of PASS (S404), and determines with respect to the reception of PASS (S405). When PASS has not been received (S405; No), the answer phone processing unit 45 waits for the reception. When PASS has been received (S405; Yes), the answer phone processing unit 45 compares the ID with PASS (S406). The answer phone processing unit 45 determines whether PASS is correct (S407). If the reference result is correct (S407; Yes), the number of missed calls and the number of voice messages are reported (S408). When the reference result is not correct (S407; No), the answer phone processing unit 45 ends the routine.

The answer phone processing unit 45 determines whether an unconfirmed recorded message exists (S410). When an unconfirmed recorded message exists (S410; Yes), the answer phone processing unit 45 replays the unconfirmed message (S411), and sets a confirmation bit to the replayed message (S412) to determine whether the message should be deleted (S413). When Yes is obtained in step S413, the answer phone processing unit 45 deletes the message file (S414). When No is obtained (S413; No), it is not deleted, and the process returns to step S410. When an unconfirmed message no longer exists (S410; No), the answer phone processing unit 45 reports that no further unconfirmed message exists (S415) and sets on-hook (S416). The routine then ends.

In the explanation of the embodiment which has been described so far, the answer phone performs the incoming process, the callee confirmation process, the message recording process and the like with respect to a single call. Unlike the use of an analog phone, an IP phone allows communication on an IP network while sharing the physical line by a unit of data with variable length called a packet rather than occupying the physical line during the voice communication. If the answer phone is allowed to perform multitask processing, the answer phone processing unit 45 automatically receives the call which has been transferred during the voice communication for providing the answer phone service. In the case where plural absent transfer calls exist, the answer phone service may be provided for the respective calls by allowing the embodiment to perform multitask processing.

The following features may be added to the aforementioned embodiment, that is, when the normal ringtone or the proxy response ringtone is output after the callee is identified in the callee confirmation unit 44, the ringtone designated with only the specific number is output. Alternatively, the user who sets the answer phone preliminarily registers a favorite message by his/her own voice with respect to the absent message notifying the caller of the absence upon the voice message processing, and the thus registered message may be designated as the one to be replayed to the caller.

Figure 16:
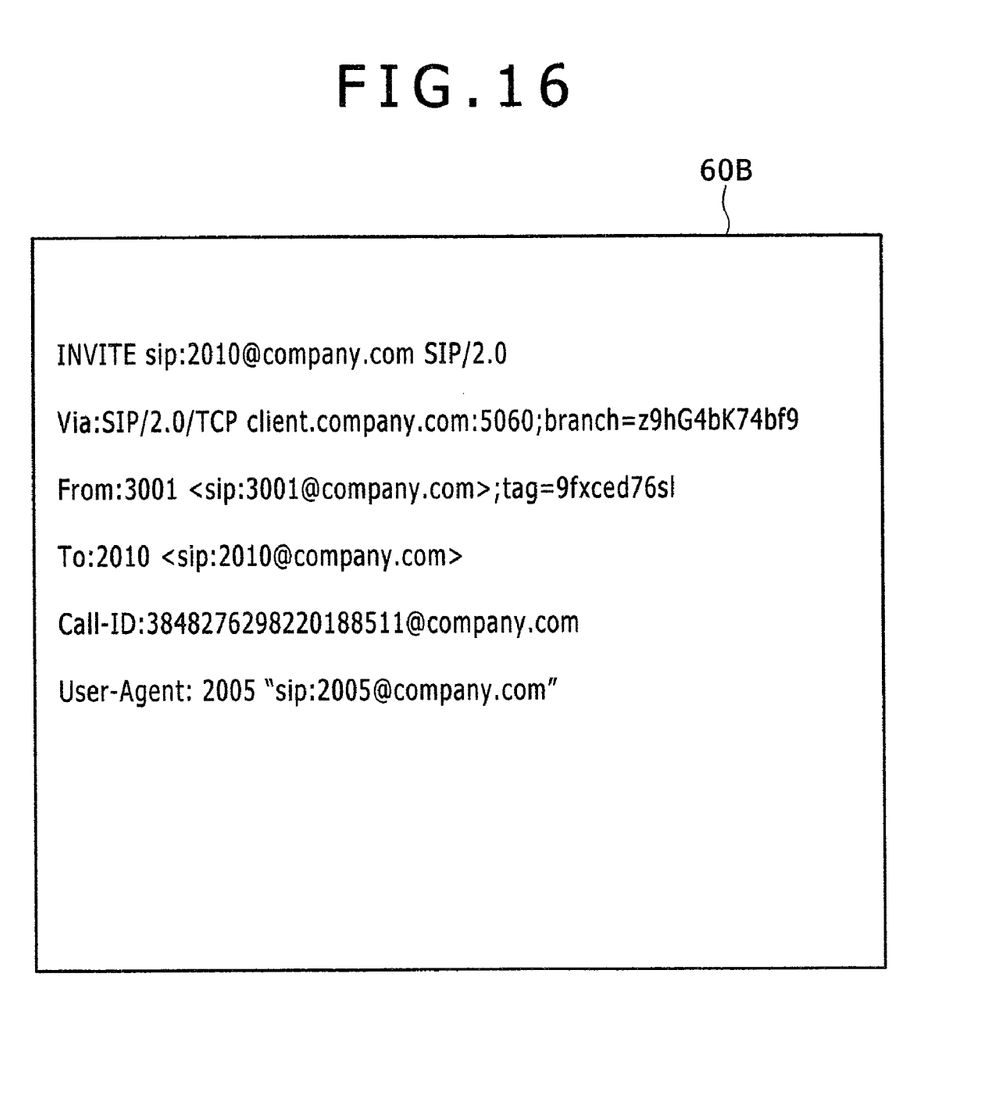
FIG. 16 is an explanatory view of an INVITE message using a User-Agent header.

Referring to FIG. 16, an INVITE message other than the aforementioned embodiment will be described. FIG. 16 is an explanatory view of an INVITE message using a User-Agent header. Referring to FIG. 16, a request sentence is written on the first line of the INVITE message 60B, and specifically, requesting the call connection to the phone #2010. Subsequently, the caller information and the callee information are shown at the From header and the To header, respectively. The INVITE message 60B apparently shows that the phone #3001 requests call connection to the phone #2010. However, the User-Agent header shows that the original callee information is set to the phone #2005.

The User-Agent header is originally expected to represent the information on UAC (user agent client) for starting the request. However, it hardly uses the SIP in consideration with the security.

Referring to FIG. 16, upon the absent transfer, the telephony server 11 writes the callee number information prior to the absent transfer to the User-Agent header. The answer phone reads the information in the field so as to communicate the original callee number information to the transfer destination. As shown in the drawing, the User-Agent header stores the callee number information prior to the absent transfer. The syntax rule of the User-Agent header field is preliminarily defined between the telephony server and the client (phone terminal) managed thereby in accordance with RFC2616 which defines the header.

A specification which allows the addition of an extended portion as necessary as a main feature of the SIP protocol may be employed to define an unique option header.

When the phone call is made to the number of the softphone in an OFF state, and the absent message is transferred to the absent transfer destination preliminarily registered in the telephony server, the user of the phone is allowed to determine whether the call has been transferred based on the phone incoming pattern.

What is claimed is:

1. A telephone system which includes an IP (Internet Protocol) phone, an IP proxy response phone, and a server for controlling reception/transmission between the IP phone and the IP proxy response phone,
   wherein said server determines a state of the IP phone upon receiving an incoming call addressed to the IP phone;
   when it is determined that the IP phone is unable to answer the call, said server applies an identifier of the IP phone to transfer the incoming call to the IP proxy response phone;
   wherein the identifier is a History-Info header or a User-Agent header of an INVITE message;
   wherein upon receiving the incoming call, the IP proxy response phone determines whether the incoming call has been transferred or is addressed to the IP proxy response phone;
   wherein the IP proxy response phone correlatively stores a caller number and a callee number of the IP phone in a case where the INVITE message includes the History-Info header or the User-Agent header; and
   wherein the IP proxy response phone correlatively stores a caller number and a callee number of the IP proxy response phone in a case where the INVITE message does not include the History-Info header or the User-Agent header.

2. The telephone system according to claim 1, wherein the IP proxy response phone outputs a ringtone based on the determination.

3. The telephone system according to claim 1, wherein the IP proxy response phone includes a recording function, further correlatively stores the recorded file information and the caller number.

4. The telephone system according to claim 2, wherein said IP proxy response phone includes a recording function, and further correlatively stores the recorded file information and the caller number.

5. The telephone system according to claim 1, wherein the IP phone is formed by connecting a computer with a handset.

6. The telephone system according to claim 2, wherein the IP phone is formed by connecting a computer with a handset.

7. The telephone system according to claim 3, wherein the IP phone is formed by connecting a computer with a handset.

8. The telephone system according to claim 4, wherein the IP phone is formed by connecting a computer with a handset.

9. The telephone system according to claim 1, wherein the IP phone transmits authentication operations to the IP proxy response phone and receives a state of missed calls from the IP proxy response phone.

10. A proxy response telephone connected to a telephone and a telephony server via a network,
    wherein when an INVITE message is received from the telephony server, the INVITE message is analyzed to determine whether the INVITE message includes a History-Info header or a User-Agent header, and it is determined whether the message is a transferred call or addressed to the proxy response telephone, based on which a ringtone is output;
    wherein the proxy response telephone correlatively stores a caller number which is obtained from the INVITE message, and a callee number of the telephone which is obtained from the History-Info header or the User-Agent header in case where the INVITE message includes the History-Info header or the User-Agent header; and
    wherein the proxy response telephone correlatively stores a caller number which is obtained from the INVITE message, and a callee number of the proxy response telephone.

11. The proxy response telephone according to claim 10, wherein a display is output based on the determination result.

12. The proxy response telephone according to claim 10, wherein a response message is transmitted subsequent to an output of the ringtone for a predetermined period for switching into a recording mode.

13. The proxy response telephone according to claim 11, wherein a response message is transmitted subsequent to an output of the ringtone for a predetermined period for switching into a recording mode.

14. The proxy response telephone according to claim 10, wherein when authentication operations are received from the telephone, the proxy response telephone replays a state of missed calls to the telephone.

* * * * *